J. H. ELWARD.

Improvement in Harvesters.

No. 127,324. Patented May 28, 1872.

Witnesses.
Alex. Mahon
H. H. Doubleday

Inventor.
J. H. Elward
by his Attorney
A. M. Smith

UNITED STATES PATENT OFFICE.

JOHN H. ELWARD, OF POLO, ILLINOIS.

IMPROVEMENT IN HARVESTERS.

Specification forming part of Letters Patent No. 127,324, dated May 28, 1872.

*To all whom it may concern:*

Be it known that I, JOHN H. ELWARD, of Polo, county of Ogle, State of Illinois, have invented certain new and useful Improvements in Harvesting-Machines, of which the following is a full, clear, and exact description, reference being had to the accompanying drawing making part of this specification, and in which—

Figure 1:
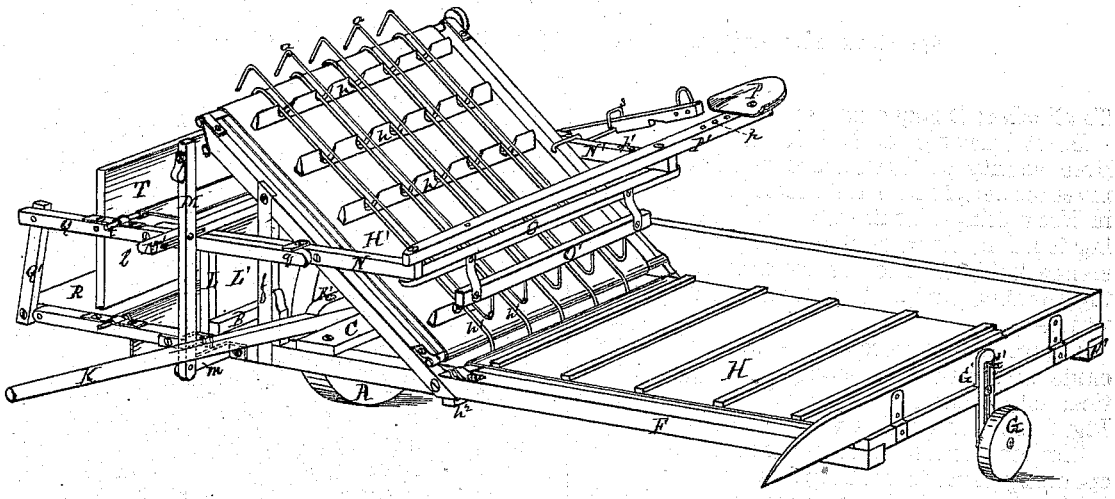
Figure 2:
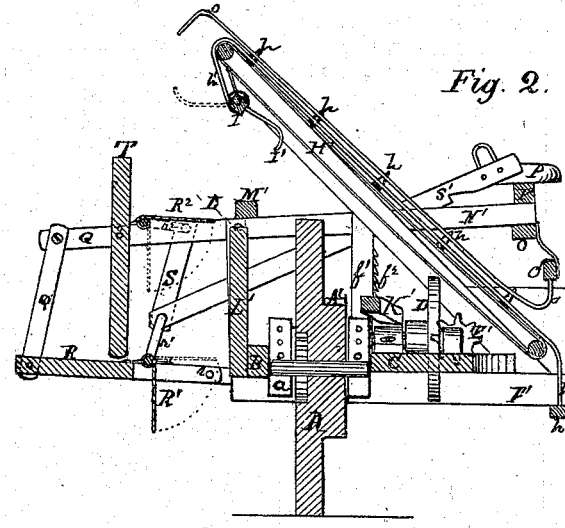
Figure 3:
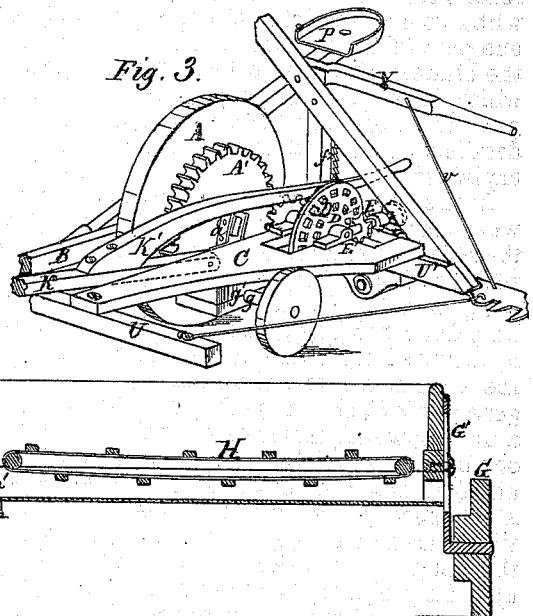

Figure 1 is a perspective view of the machine arranged for reaping. Fig. 2 is a vertical longitudinal section of the same, and Fig. 3 is a perspective view of the mower.

Similar letters of reference denote corresponding parts in both figures.

The first part of the invention consists in mounting the secondary or bevel-wheel shaft, the crank-shaft, and the support for one end of the main axle of a harvesting-machine upon a removable gear plank or frame in such manner that said gearing and frame may be readily removed from the reaper and combined with a separate mowing attachment. The second part of the invention consists in making the binders' platform in two parts, one part of which is hinged and may be used as a dropper. The invention further consists in certain details of construction, as will be hereinafter explained.

In the drawing, A is the main ground drive-wheel, supported in curved flanges $a$, but as these flanges and the devices connected therewith have been fully described in a prior patent granted to me they need not be particularly described here. One pair of the flanges is mounted upon the longitudinal bar B of the main frame, and the other pair upon the gear-plank C, shown plainly in Fig. 3. D is a driving-wheel, mounted upon the secondary or pinion shaft, driven from a spur-gear, A', attached to the inner face of the ground-wheel A. Wheel D corresponds to the bevel-wheel, which is ordinarily employed in machines of this class; but instead of having a bevel-gear upon its periphery has two or more concentric circles of perforations or sockets cast or cut in its face with which the teeth or spurs on the periphery of crank-shaft pinion E' on crank-shaft E engage; the construction and arrangement of these parts being fully shown in Fig. 2. Gear-plank C is in one piece, and cut out or mortised to permit the gearing to be conveniently mounted thereon in order that it (the gearing) may be readily transferred from the reaper to the mower, and vice versa.

In the machine as used for a reaper, Figs. 1 and 2, F F' are the grain-platform sills, one at the front edge and the other at the rear, by means of which the platform is connected with the gearing, and upon which the elevator, reel, and binders' stand are supported. G is the carrying-wheel. When this wheel is applied to the harvester it is mounted upon the adjustable hanger G'; but when the machine is used as a mower, it (the wheel) is secured to a short shaft, $g$, which is mounted in a suitable bearing, $g'$, attached to the under side of the gear-plank C. H is a carrying-belt, arranged behind the cutting apparatus. H' is the elevator, provided with transverse slats $h$, notched, as shown in Fig. 1 and 2, to receive the wires or rods $h^1$, which support the straw during its passage over the elevator. Rods $h^1$ are attached to their lower ends to bars $h^2$, extending from sill F to sill F', and at their upper ends to a roller, I, mounted in suitable bearings on the under side of the elevator in such manner that it can be rotated without disturbing its relation to the rods, for a purpose which will be soon explained. I' are fingers, projecting at suitable intervals (usually about a foot) from roller I. $f f^1$ are standards or braces, rising from sills F F' to support the rear or upper end of the elevator. $f^2$ is a ratchet-plate, attached to standard $f^1$ at the rear side of the machine. K is the tongue, pivoted to the gear-plank. K' is a tilting-lever. One end of this lever is rigidly attached to the tongue a short distance in front of the point at which the tongue is pivoted to the gear-plank, and the other end engages with the ratchet-plate $f^2$. By means of this lever the platform may be tilted upon main drive-wheel A and the grain or carrying wheel G, as will be readily understood. L are posts, rising from the stubble-end ends of sills F F'. L' is a grain-guard, serving to prevent the grain from becoming entangled with the driving-wheel. M is one of the reel-bearers. The lower end of this bearer is supported upon a bracket, $m$, attached to the main frame, the upper end being supported by a bolt or pin passing through the slotted end of a rail, M', which, by preference, is made long enough to extend across the machine, and is secured to posts L or bars attached to said posts. The other reel-bearer is not shown, but may be located at the inner or outer corner of the platform, as it is desired. N N' are horizontal bars, supported upon posts L and standards $f f^1$, or the frame of the elevator. O is a bar, bolted to the overhanging ends of bars N N'. O' is a secondary bar, suspended from bar O and provided with a number of elastic guiding-rods, $o$, which are bent and arranged substantially as shown—that is, so as to lie parallel or thereabout with the elevator-belt at a short distance from it—thereby serving to confine the grain to rods $h^1$ and thus render the operation of said elevator more certain. The upper ends of rods $o$ are bent downward to insure the delivery of the grain upon either the grain-receiver or the dropping devices, which will be explained hereafter. P is the seat, and P' the seat-support. The seat is adjustable upon the support by a bolt, which can be passed through either of a series of holes, $p$, and the support is pivoted to bar N and can be adjusted upon bar N' by means of bolt-holes $p'$. Thus the weight of the driver can be employed to balance the machine, as may be required. Q Q are hangers, from which the outer side of the binders' stand or platform is suspended by links Q' Q'. These hangers are pivoted to the posts L at $l$ in such manner that they can vibrate vertically. $q$ is a stop on bar N, which limits the upward throw of the inner end of the hanger, and there is a similar stop on bar N'. R is the binders'-platform, hinged at its inner side to the main frame, as at $r$, Fig. 1, and pivoted at its outer edge to links Q'. The floor or platform is made in two parts, the inner part or dropper $R^1$ being hinged to the outer part so that it can drop into the position shown in full lines, Fig. 2, when actuated by certain devices, in a manner and for a purpose which will be explained. In practice I prefer to hinge the dropper $R^1$ by means of pivots, and to the rear pivot I attach a crank-arm, $r^1$, Fig. 2, in about the relation to the dropper shown in this figure. $R^2$ is a second dropper, arranged above dropper $R^1$ and pivoted upon the hangers Q Q. Dropper $R^2$ is also provided with a crank-arm, $r^2$, the position of this arm relative to dropper $R^2$ being the reverse of crank-arm $r^1$ relative to dropper $R^1$. The crank-arms are connected by means of a link, S, and are operated by a sliding link, S', which extends past the side of the elevator to within convenient reach of the driver while riding in seat P. The free end of link S' rests in a suitable guide, $s$, and is notched upon its down side in order that it may be locked in any position in which it may be placed by the driver. T is a partition-board or fender, arranged in a vertical position outside of the droppers. It is secured to hinges Q Q by pins $t$, or equivalent devices, in such manner that it may be easily removed. U U', Fig. 3, are two short sills, which, with bar or sill B and gear-plank C, form the frame of the machine when adapted for mowing.

In Fig. 3 the cutting apparatus is hinged to the main frame, and may be lifted for passing obstruction by means of lever V and link $v$. In this figure the lifting-lever is shown pivoted to one of the inclined side pieces of the elevator, but it is obvious that some other form of support may be employed. In this figure the seat is shown supported from the outer side of the frame, this change being made to balance the machine.

In the drawing the machine is shown as it is intended to be used for a side-delivery dropper, the parts being arranged in the position into which they are moved when delivering a gavel upon the ground, the straw being now received upon the upper dropper $R^2$. As soon, however, as the gavel is delivered, the driver thrusts link S' backward—that is, from him—and the two droppers are simultaneously thrown into the position indicated in dotted lines in Fig. 2. By this movement the grain which has accumulated upon dropper $R^2$ is delivered upon dropper $R^1$, where it lies until enough has been added to it to make a gavel of the desired size, when the driver draws link S' toward him and the gavel is dropped upon the ground, the upper drop $R^2$ serving as a cut-off to prevent the grain from straggling while the lower drop $R^1$ is open, as will be readily understood.

When I wish to bind the grain as it is cut I remove the fender T and drop $R^2$ and lock drop $R^1$ up in a horizontal position, and, when deemed advisable, add a box or receptacle for the shattered grain and such rails or other supports for the binders as I may prefer. The roller I is then turned around until finger I' assumes the position shown in dotted lines, Fig. 2, thus forming a receiver, in which the grain is deposited from the elevator until enough shall have accumulated to form a gavel, when it is removed and bound.

In order to convert the reaper shown in Figs. 1 and 2 into a mower, as shown in Fig. 3, it is necessary to take the end sill or bar B, gear plank C with the gearing and tongue mounted thereon, and the main drive-wheel A from their places on the sills F F', and secure them together by the short sills U U'. Then take the seat P and its support P' and attach them to the frame (preferably on the outer side, as shown) by a socket or suitable device. Next hinge the cutting apparatus and add the lifting-lever V, link $v$, and a suitable support for them.

In practice I prefer a support which is made on purpose to be used with the mower instead of taking any part of the reaper, as the expense is but slight and it is much more convenient. By adding the grain-wheel to the inner side of the gear-plank the mower is ready for operation.

I am aware that reaping-machines have been built in which the gearing, with the exception of the cogged driving-rim on the main carrying-wheel, was mounted upon a single plank piece or frame, complete in itself and adapted to be removed from the rest of the frame-work of the machine; but in this construction there was no especial adaptation of the removable parts to fit them for being embodied in a mower, whereas in my machine the construction of the gearing and the gear frame is such as to facilitate its transfer from a reaper to a mower. Thus the secondary gear is intended to impart two distinct rates of speed to the cutters, and the hangings for the main wheel permit of the gear-frame being supported at different heights, these two features being practically indispensable in a combined machine.

It will of course be understood that as the crank is located at the rear end of the gear-plank a transmitting-lever must be employed to drive the cutters, which are to be arranged at the front edge of the grain platform when the machine is reaping.

By arranging the seat as shown I use the bars N N' O for supporting both the seat P and the guiding-rods o.

It will be readily seen that as the hangers Q and platform R are pivoted to the frame-work of the harvesters, and the links Q' are pivoted to the hangers and the platform, these devices, together with dropper $R^2$, when it is in position on the machine, can be folded up compactly for passing through gate-ways and similar contracted places. As the grain passes over the upper end of the elevator H' the wires $h'$, which are bent into a nearly vertical position instead of conforming to the path of the elevator, insure the delivery upon either the grain-receiver or the droppers, and serve to prevent it (the grain) from clinging to the slats $h$.

Certain features of construction and arrangement hereinabove described are embraced in another application, and are therefore not here claimed.

I am aware that a carrying-belt or apron with transverse slats having projecting spikes or spurs has been used in combination with supporting and guiding wires in their class of machines, but I regard the knife-edged slats used in my machine as being a decided improvement upon the spurs for the following reasons: As the grain frequently falls in a somewhat tangled condition upon the platform it is very desirable to straighten it before it is delivered to the binders. It is difficult if not impossible to do this on those elevators in which spurs are employed, because they penetrate the straw, thus keeping it in the same position while it is being elevated, and delivering it to the grain-receiver substantially in a swath; whereas in my construction the slats present as nearly as possible a continuous knife-edge, broken only by narrow notches to receive the wires. As the grain is carried up its progress is retarded by wires $h^1$ and $o$, the greatest pressure being exerted immediately over the slats and wherever there is any accumulation of straw. It will be apparent that under this construction and arrangement of devices the straw will be pulled apart and divided at each slat, and will be discharged into the receiver in small handfuls, thus greatly facilitating the operation of binding.

Having now described my invention, what I claim as new, and desire to secure by Letters Patent, is—

1. In a machine for reaping grain a removable gear and gear-frame, said gearing being adapted to drive the cutters at different velocities and the gear-frame being constructed substantially as described, so that it can be supported upon the main wheel at different heights, substantially as and for the purpose set forth.

2. The binder's platform, constructed of two parts, R $R^1$, hinged to each other, substantially as described, so that one part may be operated as a dropper, substantially as set forth.

3. In combination with the bar I, to which is attached the upper ends of rods $h'$, the fingers I', whereby said bar I is made to serve both as a support for rods $h'$ and as a head for its rocking grain-receiving fingers, substantially as set forth.

4. In combination with the elevating-apron H' and the two series of supporting and guiding wires or rods $h^1$ $o$, the notched knife-edged slats $k$, constructed and operating substantially as set forth.

In testimony whereof I have hereunto set my hand this 8th day of March, A. D. 1871.

JOHN H. ELWARD.

Witnesses:
 JOHN MICKLER,
 WAYLAND S. GOODHUE.